Jan. 22, 1963 G. A. CUTSOGEORGE ETAL 3,075,128
STABLE TRANSISTORIZED NETWORK RESPONSIVE TO A CHANGE IN CONDITION
Filed Feb. 20, 1959
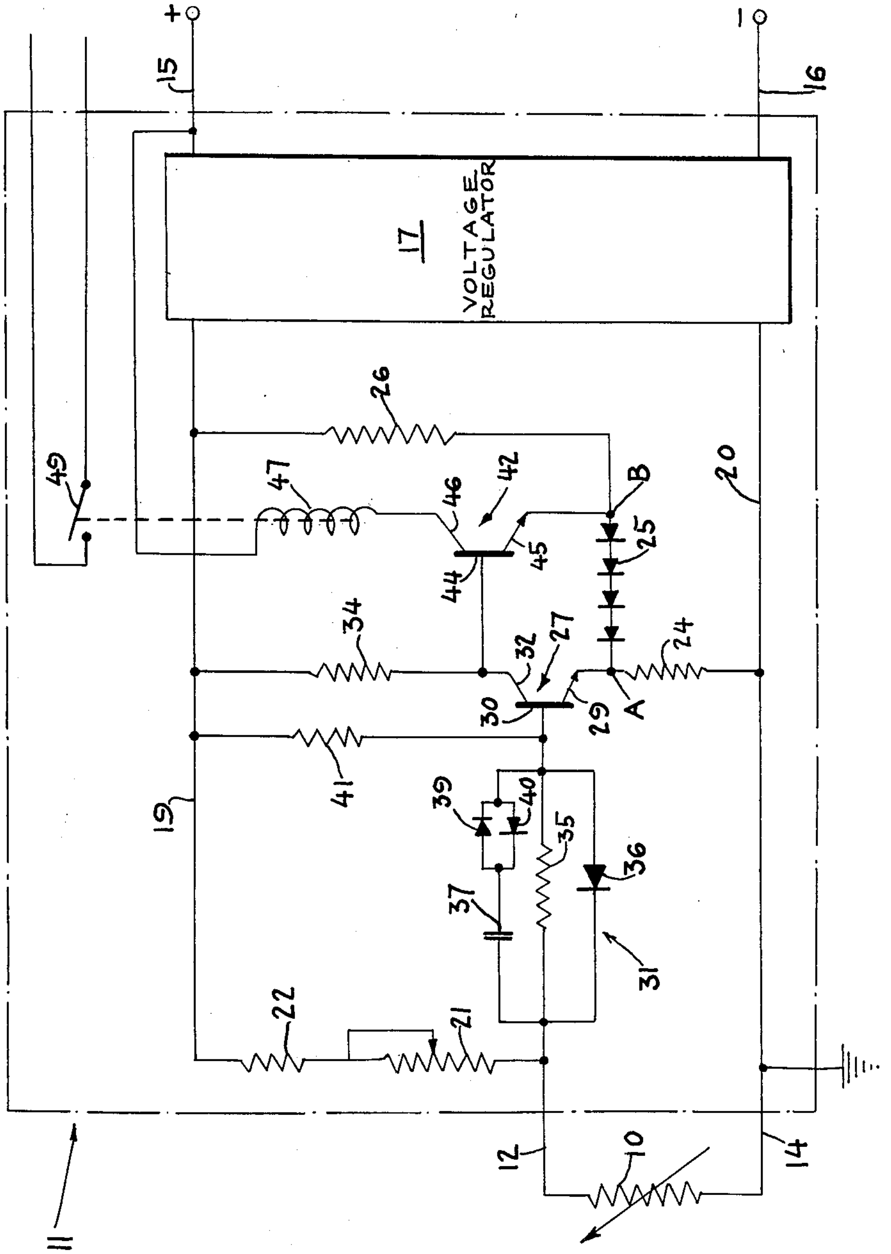
INVENTORS
George A Cutsogeorge
William J. Spaven
BY
Gerald Durstewitz
AGENT United States Patent Office 3,075,128
Patented Jan. 22, 1963

3,075,128

STABLE TRANSISTORIZED NETWORK RESPONSIVE TO A CHANGE IN CONDITION

George A. Cutsogeorge, Belleville, and William J. Spaven, North Arlington, N.J., assignors to Specialties Development Corporation, Belleville, N.J., a corporation of New Jersey Filed Feb. 20, 1959, Ser. No. 794,660
5 Claims. (Cl. 317—148.5)

The present invention relates to condition responsive transistorized networks which are stable in operation, and, more particularly, to such networks which are stable throughout a wide range of ambient temperatures and primarily at high ambient temperatures.

The present invention, although useful for many other purposes, is concerned with improving heat and flame detecting networks of the type shown in co-pending application for Letters Patent of the United States, Serial No. 624,074, filed November 23, 1956, assigned to the assignee of this application, and now Patent No. 2,901,740. Such networks include a thermistor element which has an infinitely high resistance at normal temperatures and a low resistance at abnormally high temperatures, and a control unit for monitoring the resistance of the thermistor. The thermistor element is connected in series with a resistor (in the control unit) across a source of unidirectional current, and the change in potential at the junction point of the thermistor and the resistance, which occurs when the resistance of the thermistor changes in value, is used to control the conductive state of a transistor connected thereto. This transistor is biased so that it is in full conduction when the resistance of the thermistor is high and is non-conducting when the resistance of the thermistor drops in response to a fire or overheat condition. A second transistor is directly connected to the output of the first transistor and is biased so that it is in a non-conducting state when the first transistor is in full conduction and is in full conduction when the first transistor is non-conducting. A relay is connected in the output circuit of the second transistor and is energized to give an alarm when the second transistor conducts. The network is arranged so that the second transistor begins to conduct when the first transistor moves away from full conduction, and a feed back arrangement is provided which causes the first transistor to be rapidly driven to cutoff when the second transistor begins to conduct.

Heretofore in these networks, the transistors have been biased by connecting their emitters to separate voltage dividing resistance arrangement each connected across the direct current source, and the feedback was provided by a resistor connecting the emitters of the transistors.

These biasing and feedback arrangements are completely satisfactory for applications where the control unit is subjected to normal ambient temperatures, and for such applications inexpensive germanium transistors are satisfactory and commonly are employed. However, since germanium transistors break down at high temperatures, silicon transistors must be used in networks designed for applications wherein the control unit is normally subjected to such temperatures.

It has been found that the aforementioned type of network will not operate properly throughout a wide temperature range when the biasing and feedback arrangements described above are used in conjunction with silicon transistors. With such biasing arrangements, the emitter current of each of the transistors flows through a portion of the associated voltage dividing resistance arrangement, therefore, when the second transistor goes into full conduction, increasing its emitter current, the potential at the emitter increases and the voltage impressed across the transistor and the relay decreases. The resistance of a silicon transistor at full conduction increases rapidly with increases in temperature and therefore the current flowing through the transistor and the relay coil decreases when the control unit is subjected to high ambient temperatures. This effect coupled with the aforementioned decrease in the voltage impressed across the transistor and the relay coil is sufficient to reduce the current flow through the relay to a point where the relay will not operate when a fire is sensed by the thermistor.

Accordingly, an object of the present invention is to provide a condition responsive network which will operate at high ambient temperatures.

Another object is to provide such a network which will operate in a stable manner throughout a wide range of ambient temperatures.

Another object is to provide such a network which is stable with respect to ambient temperature variations and includes a minimum number of components.

A further object is to provide such a network which is simple, economical and reliable.

Other and further objects of the invention will be obvious upon an understanding of the illustrative embodiment about to be described, or will be indicated in the appended claims, and various advantages not referred to herein will occur to one skilled in the art upon employement of the invention in practice.

In accordance with the present invention the foregoing objects are accomplished by providing a condition responsive network which includes means responsive to a condition for producing a direct current potential which changes in magnitude in response to a change in the condition; a transistor having an input circuit connected to be controlled by the condition responsive means and having an output circuit; a second transistor having an input circuit connected to be controlled by the output circuit of the first transistor and having an output circuit; an electrically operable device connected to the output circuit of the second transistor; and biasing means common to the input circuits of both transistors providing a biasing voltage to the first transistor which varies with the conductive state of the second transistor and providing a biasing voltage to the second transistor which is substantially constant.

A preferred embodiment of the invention has been chosen for purposes of illustration and description, and is shown in the accompanying drawing, forming a part of the specification, wherein:

The single FIGURE of the drawings is a wiring diagram of a condition responsive network in accordance with the present invention.

Referring to the drawing in detail, there is shown a network in accordance with the invention which generally comprises a thermistor element 10 located in an area to be protected against fire or overheat, a control unit 11 located remotely with respect to the element and connected to the element 10 by means of conductors 12 and 14 to monitor the resistance of the element 10; and a source of unidirectional current E for energizing the control unit having its positive and negative sides connected to the control unit by conductors 15 and 16, respectively.

The control unit 11 includes a voltage regulator 17 for providing a constant voltage output having an input connected to conductors 15 and 16, the positive and negative sides of the output being connected to a pair of conductors 19 and 20, respectively.

The conductors 12 and 14 connect the thermistor element 10 to the control unit in series with an adjustable resistor 21 and a current limiting resistor 22 between the conductors 19 and 20. The thermistor element has a very high resistance (60,000 to 500,000 ohms) at normal temperatures and a low resistance (200 to 2000 ohms) at temperatures produced by a fire or overheat condition, and, in the preferred embodiment of the invention, the resistor 21 is adjusted to a value which together with the value of the limiting resistor 22 provides a resistance which is small in comparison to the resistance of the element 10 at normal temperatures and is large in comparison to the resistance of the element 10 at fire and overheat temperatures.

A voltage dividing arrangement including a resistor 24, four silicon diodes 25, and a resistor 26, all in series, is also connected between the conductors 19 and 20, and this arrangement provides a source of reference potentials. The diodes 25 have the characteristic that the voltage drop across them is substantially constant irrespective of the current flowing through them, and the diodes 25 and the resistors 24 and 26 are such that the voltage drop across the resistor 24 is small with respect to the voltage drop across the diodes. In the preferred embodiment of the invention, the value of the resistor 24 is small with respect to the value of the resistor 26 to provide a positive potential at the junction point A of the resistor 24 and the diodes 25 which is a small portion of the potential at the conductor 19.

An NPN type silicon junction transistor 27 is provided to detect variations in the resistance of the element 10. The transistor 27 has an emitter 29 connected to the junction A of the resistor 24 and the diodes 25, a base 30 connected to the conductor 12 through a rate sensitive and temperature compensating network 31, and a collector 32 connected to the conductor 19 through a load resistor 34. The compensating network 31 comprises a resistor 35, a silicon diode 36 in parallel with the resistor 35, a tantalum capacitor 37, and a pair of opposed silicon diodes 39 and 40 connected in parallel with each other and in series with the capacitor 37 across the resistor 35. The base 30 is also connected to the positive conductor 19 through a resistor 41.

The output of the transistor 27 controls a second NPN type silicon junction transistor 42 which has a base 44 connected to the collector 32 of transistor 27, an emitter 45 connected to the junction B of the diodes 25 and the resistor 26, and a collector 46 connected to the positive conductor 15 of the unregulated source through a relay winding 47 which controls a switch 49 in an external indicating circuit.

In the operation, the voltage of the source feeding the conductors 15 and 16 may vary throughout a given range, and the voltage regulator 17 responds to these variations and provides a constant voltage across the conductors 19 and 20.

When the thermistor 10 is at normal temperature, its resistance is very high, therefore, substantially all of the voltage across the conductors 19 and 20 is dropped across the thermistor 10, and the conductor 12 has a very high positive potential. As previously mentioned, the junction point A of the resistor 24 and the diodes 25 has a low positive potential. The base 30 of the transistor 27, therefore, is more positive than the emitter 29 and current flows from the conductor 19 both through the resistors 22, 21 and 35 and through the resistor 41 to the base 30, and through the base emitter circuit of the transistor 27 and the resistor 24 to the conductor 20. This flow places the transistor 27 in full conduction and allows current to flow from the conductor 19 through the load resistance 34, the collector emitter circuit of the transistor, and the resistor 24 to the conductor 20. With the transistor 27 in full conduction the collector 32 is less positive (with respect to the conductor 20) than the junction point B of the diodes 25 and the resistor 26. The base 44 of transistor 42 is therefore less positive than the emitter 45, and the transistor 42 is held in a cutoff condition.

As the resistance of the thermistor 10 decreases in response to an increase in temperature, the potential of the conductor 12 decreases and the current supplied to the base 30 of the transistor 27 through the resistors 21 and 22 likewise decreases. The current flowing to the base 30 through the resistor 41, however, remains substantially constant until the conductor 12 becomes less positive than the base 30 thereby allowing the diode 36 to conduct.

When the conductor 12 becomes less positive than the base 30, some of the current flowing through the resistor 41 is shunted away through the diode 36 thereby reducing the base current of the transistor 27. At some predetermined temperature condition, the potential of the conductor 12 will be such that sufficient current will be diverted from the base circuit to reduce the collector current to a point so that the base 44 of transistor 42 will be more positive than the emitter 45, and the transistor 42 will begin to conduct.

The exact resistance value of the thermistor 10 which will reduce the collector current in the transistor 27 to the operating level is dependent upon the adjustment of the resistor 21 and upon the relation of the resistance of the diode 36 to the base-emitter resistance of the transistor 27. Since both the diode 36 and the transistor 27 are silicon semi-conductors, their resistances vary with temperature in the same manner, whereby the point of operation does not vary appreciably with temperature.

In order that a flash or rapid fire may be detected before it reaches dangerous proportions and is difficult to extinguish, the rate portion of the network 31 operates when the thermistor element 10 is exposed to a rapid increase in temperature, to give an indication before this element is heated to a temperature sufficient to balance the bridge.

The potential at the base 30 controls the conduction of the transistor 27 and is at all times equal to the source voltage minus the voltage drop across the resistor 41. The rate portion of the network 31 affects the conduction of the transistor 27 by influencing the voltage drop across the resistor 41 as about to be described.

When the resistance of the thermistor element is high and constant, the diode 36 is not conducting, the transistor 27 is conducting, the capacitor 37 is charged to the voltage drop across the resistor 35, and the voltage drop across the resistor 41 is constant and proportional to the current flowing therethrough to the base 30.

As the resistance of the thermistor element 10 decreases slowly in response to a normal increase in ambient temperature, the potential of the conductor 12 slowly approaches that of the base 30 causing the current flow through the resistor 35 to decrease, and the capacitor 37 discharges through the resistor 35 at a rate sufficient to maintain its charge equal to the IR drop across the resistor 35. Under these conditions, the voltage drop across the resistor 41 remains constant holding the potential at the base 30 constant.

However, when the resistance of the thermistor element 10 drops rapidly, the capacitor 37 cannot discharge through the resistor 35 at a comparable rate and therefore an appreciable discharge current also flows from the positively charged side of the capacitor through the element 10 and the power supply, and through the resistors 21 and 22 (in parallel with the element 10 and the power supply), to the conductor 19 and through the resistor 41 to the negatively charged side. This discharge current increases the voltage drop across the resistor 41 thereby decreasing the positive potential on the base 30. It will be seen that, if the discharge of the capacitor 37 increases the current through the resistor 41 to a point where the voltage drop across the resistor is greater than the source voltage, the base 30 will be driven negative with respect to ground. This circuit is arranged so that when the resistance of the thermistor element 10 decreases rapidly to a value of 30,000 ohms or less the rate capacitor 37 drives the transistor 27 to cutoff.

With respect to the operations described so far, the network disclosed herein functions in the same manner as the network disclosed in the aforementioned application. The remainder of the operation of the network disclosed herein, however, permits stable operation throughout a wide range of ambient temperatures extending from very high temperatures to very low temperatures as about to be described.

When the transistor 42 begins to conduct, the current flowing through the diodes 25 and the resistor 24 increases causing the voltage drop across the resistor 24 to increase. The positive potential present at the emitter 29 is thereby increased, driving the transistor 27 to cutoff. The transistor 42 then goes into full conduction causing current to flow from the positive side of the source through the relay coil 47 to the conductor 20, energizing the relay coil 47 and closing the switch 49 to give an indication in the external circuit that a fire or dangerous heat condition exists.

The current flow through the relay coil 47 is equal to the difference in the potential at the positive side of the source and at the junction point B divided by the sum of the emitter collector resistance of the transistor 42 and the resistance of the coil 47. As the ambient temperature in the control unit increases, the resistance of the coil 47 and the silicon transistor 42 both increase, and the voltage across the coil and the transistor must be maintained at as high a value as possible in order that the current flow through the coil will be sufficient to close the switch 49 at high ambient temperatures.

Since the voltage regulator 17 has an internal resistance, the constant potential at the conductor 19 is always less than the potential at the conductor 15. Thus, by directly connecting the coil 47 to the conductor 15, the highest available potential is always present at the positive side of the coil.

As previously mentioned, the voltage drop across the diodes 25 remains constant as the current flowing therethrough varies. Therefore, as the transistor 42 goes from the non-conducting condition to the conducting condition, the potential of the junction point B changes only by the amount of the change in the voltage drop across the resistor 24. Since the current flowing through the resistor 24 in the first condition includes the emitter current of the transistor 27 and in the second condition includes the emitter current of the transistor 42, the resulting change in the voltage drop across the resistor 24 is small and does not appreciably affect the potential present at the junction point B. By selecting the components so that the voltage drop across the resistor 24 is small with respect that across the diodes 25, the effect of any given percentage variation in the voltage drop across the resistor 24 is further decreased.

Since the maximum available potential is always present at the positive side of the coil 47 and since the potential at the junction point B does not substantially increase when the transistor 42 goes into conduction, the largest possible portion of the source voltage is impressed across the transistor 42 and the relay coil 47 when the transistor 42 is conducting. Therefore, when the element 10 detects a fire, a maximum current flows through the relay coil and the operation of the switch 49 is assured at high ambient temperatures.

The diodes 39 and 40 are included in the circuit to prevent the inherently low back resistance of the tantalum capacitor 37 from shunting the diode 46 thereby impeding its temperature compensating function.

From the foregoing, it will be seen that the present invention provides a simple and economical condition responsive system which operates in a stable manner throughout a wide range of ambient temperatures, including high ambient temperatures.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a condition responsive network, the combination of means responsive to a condition for producing a direct current potential which changes in magnitude in response to a change in the condition; a transistor having an input circuit connected to be controlled by said condition responsive means and having an output circuit; a second transistor having an input circuit connected to be controlled by said output circuit of said first transistor and having an output circuit, said transistors having internal resistances which increase with increases in temperature; a current operated device connected to said output circuit of said second transistor; and biasing means including a circuit element common to said input circuits of both said transistors providing a biasing voltage to said first transistor which varies with the conductive state of said second transistor and providing a biasing voltage to said second transistor which is substantially constant.

2. In a condition responsive network, the combination of means responsive to a condition for producing a direct current potential which changes in magnitude in response to a change in the condition; a transistor having an input circuit connected to be controlled by said condition responsive means and having an output circuit; a second transistor having an input circuit connected to be controlled by said output circuit of said first transistor and having an output circuit, said transistors having internal resistances which increase with increases in temperature; a current operated device connected to said output circuit of said second transistor and responsive to the current flow in said output circuit; and biasing means including a circuit element common to said input circuits of both of said transistors providing a biasing voltage to said first transistor which places said first transistor in a conductive state dependent upon the potential of said responsive means and providing a biasing voltage to said second transistor which places said transistor in a conductive state dependent upon the output of said first transistor, said biasing means being constructed and arranged to maintain the biasing voltage to said second transistor constant and to cause the biasing voltage on said first transistor to change when the conductive state of said second transistor changes.

3. In a condition responsive network, the combination of a source of unidirectional current; a voltage regulator connected to said source and having a constant voltage output; first and second resistance elements connected in series across the output of said regulator, one of said resistance elements being constructed and arranged to change in value in response to a change in the condition; a transistor having an input circuit connected to be controlled by the potential at the junction of said elements and having an output circuit; a second transistor having an input circuit connected to be controlled by the output of said first transistor and having an output circuit; a current responsive device connecting said output circuit of said second transistor to said source; and biasing means connected across the output of said regulator and to said input circuits of both of said transistors providing a biasing voltage to said first transistor which places said first transistor in a conductive state dependent upon the potential at the junction of said resistance elements and providing a biasing voltage to said second transistor which places said second transistor in a conductive state dependent upon the output of said first transistor, said biasing means being constructed and arranged to maintain the biasing voltage to said second transistor constant and to cause the biasing voltage on said first transistor to change when the conductive state of said second transistor changes.

4. In a condition responsive network, the combination of a source of unidirectional current; first and second resistance elements connected in series across said source, one of said elements being constructed and arranged to change in value in response to a change in the condition; a transistor having an input circuit connected to be controlled by the potential at the junction of said elements and having an output circuit; a second transistor having an input circuit connected to be controlled by said output circuit of said first transistor and having an output circuit, said transistors having internal resistances which increase with increases in temperature; a current operated device connected to said output circuit; and biasing means including a resistance element connected to one side of said source, a second resistance element connected to the other side of said source, and means providing a constant voltage drop connecting said resistance elements, said first transistor being connected to the junction of one of said biasing resistance elements and said last mentioned means and said second transistor being connected to the junction of said second biasing resistance element and said last mentioned means.

5. In a condition responsive network, the combination of a source of unidirectional current; a voltage regulator connected to said source and having a constant voltage output; first and second resistance elements connected in series across the output of said regulator, one of said resistance elements being constructed and arranged to change in value in response to a change in the condition; a transistor having an input circuit connected to be controlled by the potential at the junction of said elements and having an output circuit; a second transistor having an input circuit connected to be controlled by the output of said first transistor and having an output circuit, said transistors having internal resistances which increase with increases in temperature; a current responsive device connecting said output circuit of said second transistor to said source; and biasing means including a resistance element connected to one side of the output of said regulator, a second resistance element connected to the other side of the output of said regulator, and means providing a constant voltage drop connecting said resistance elements, said first transistor being connected for bias to one end of said last mentioned means and said second transistor being connected for bias to the other end of said last mentioned means.

References Cited in the file of this patent

UNITED STATES PATENTS

| | | |
|---|---|---|
| 2,751,545 | Chase | June 19, 1956 |
| 2,751,550 | Chase | June 19, 1956 |
| 2,787,712 | Priebe | Apr. 2, 1957 |
| 2,828,450 | Pinckaers | Mar. 25, 1958 |
| 2,832,900 | Ford | Apr. 29, 1958 |
| 2,848,658 | Mitchell | Aug. 19, 1958 |
| 2,871,376 | Kretzmer | Jan. 27, 1959 |
| 2,901,740 | Cutsogeorge | Aug. 25, 1959 |
| 2,945,174 | Hetzler | July 12, 1960 |